United States Patent
Kuboki et al.

[11] Patent Number: 6,124,420
[45] Date of Patent: Sep. 26, 2000

[54] EPOXY RESIN, EPOXY RESIN COMPOSITION AND HARDENED PRODUCT THEREOF

[75] Inventors: Kenichi Kuboki, Matsudo; Yoshio Shimamura, Tokyo; Ryoichi Hasegawa, Yono; Yoshiaki Kurimoto, Takasaki; Akiyuki Kojima, Takasaki; Yukio Abe, Takasaki, all of Japan

[73] Assignees: Nippon Kayaku Kabushiki Kaisha, Tokyo; Gun Ei Chemical Industry Co., Ltd., Takashi, both of Japan

[21] Appl. No.: 08/930,892

[22] PCT Filed: Feb. 7, 1997

[86] PCT No.: PCT/JP97/00331

§ 371 Date: Dec. 5, 1997

§ 102(e) Date: Dec. 5, 1997

[87] PCT Pub. No.: WO97/29144

PCT Pub. Date: Aug. 14, 1997

[30] Foreign Application Priority Data

| Feb. 9, 1996 | [JP] | Japan | 8-024174 |
| Jun. 6, 1996 | [JP] | Japan | 8-144548 |

[51] Int. Cl.$^7$ .................................................. C08G 59/08
[52] U.S. Cl. ............................................. 528/87; 528/421
[58] Field of Search ........................................ 528/87, 421

[56] References Cited

U.S. PATENT DOCUMENTS

| 4,518,762 | 5/1985 | Krueger et al. | 528/95 |
| 5,106,923 | 4/1992 | Bertram et al. | 525/507 |

FOREIGN PATENT DOCUMENTS

| 62-501780 | 7/1987 | Japan . |
| 63-81118 | 4/1988 | Japan . |
| 63-301218 | 12/1988 | Japan . |
| 1-190722 | 7/1989 | Japan . |
| 2-88628 | 3/1990 | Japan . |
| 3-47826 | 2/1991 | Japan . |
| 3-23723 | 10/1991 | Japan . |
| 4-63826 | 2/1992 | Japan . |
| 4-220422 | 8/1992 | Japan . |
| 4-225012 | 8/1992 | Japan . |
| 4-318017 | 11/1992 | Japan . |
| 5-255476 | 10/1993 | Japan . |
| 5-287053 | 11/1993 | Japan . |
| 7-48425 | 2/1995 | Japan . |
| 86/04075 | 7/1986 | WIPO . |

*Primary Examiner*—Robert Dawson
*Assistant Examiner*—D. Aylward
*Attorney, Agent, or Firm*—Nields, Lemack & Dingman

[57] ABSTRACT

This invention provides a novolak type epoxy resin which has low melt viscosity but shows high heat resistance when hardened. Particularly, it relates to a novolak type epoxy resin in which the relationship between the total % by weight of 3 to 6 nucleus bodies and the melt viscosity measured by a cone plate method at 150° C. satisfies specified conditions, an epoxy resin composition containing the same and hardened products thereof.

17 Claims, 4 Drawing Sheets

Ratio of Total Weight of 3 to 6 Nucleus Bodies (%)

EPOXY RESIN, EPOXY RESIN COMPOSITION AND HARDENED PRODUCT THEREOF

FIELD OF THE INVENTION

This invention relates to an epoxy resin, an epoxy resin composition and a hardened product thereof, which are useful in electric and electronic parts-insulating materials, including semiconductor sealing materials with high reliability, and various composite materials, including laminated sheets (printed circuit boards) and CFRP (carbon fiber reinforced plastics), as well as adhesives, paints and the like.

PRIOR ART

Epoxy resin is broadly used in the field of electric and electronic parts, structural materials, adhesives, paints and the like because of its high workability and excellent properties of its hardened products such as electric characteristics, heat resistance, adhesive property, moisture resistance (water resistance) and the like.

However, further improvement of the epoxy resin, in terms of its high purity, heat resistance, moisture resistance, adhesive property, low viscosity for high filler charging and the like various characteristics, has been called for in the electric and electronic field with the recent development. In addition, development of a light weight epoxy resin which has excellent mechanical properties and also has low viscosity for the improvement of workability has been called for as a structural material in the area of aerospace and aircraft materials, leisure and sports tools and the like. In response to these demands, a large number of epoxy resin compositions have been proposed, but they are not satisfactory yet.

DISCLOSURE OF THE INVENTION

With the aim of finding an epoxy resin having the aforementioned characteristics, the inventors of the present invention have conducted intensive studies and accomplished the present invention as the results.

Accordingly, the present invention relates to (1) an epoxy resin represented by the following formula (I):

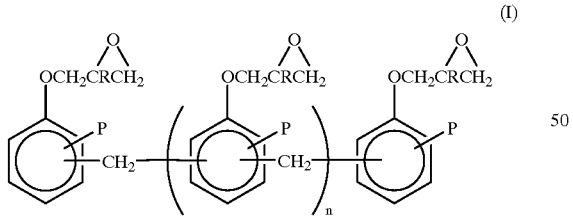

(I)

(in the formula (I), each P represents a hydrogen atom or a methyl group and P in the molecule are mutually the same, R represents a hydrogen atom or an alkyl group having 1 to 5 carbon atoms, and n is a positive number of 0.1 to 20 on average), wherein the plot of melt viscosity of said epoxy resin measured at 150° C. by a cone plate method (variable, y; unit, poise) vs. the ratio of the total weight of 3 to 6 nucleus bodies in said epoxy resin (variable, x; unit, % by weight) satisfies the following conditions:

(a) when P is hydrogen atom, said plot is present within the area surrounded by the lines of:

1) $y=60e^{-0.115x}$, 2) $y=1000e^{-0.115x}$, 3) $x=10$ and 4) $x=70$, or (b) when P is methyl group, said plot is present within the area surrounded by the lines of:

1) $y=500e^{-0.120x}$, 2) $y=10000e^{-0.120x}$, 3) $y=400$ and 4) $y=0.1$, (2) the epoxy resin according to the aforementioned item (1) wherein the epoxy resin is an epoxy resin represented by the following formula (II):

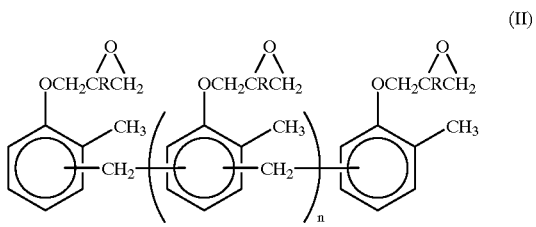

(II)

(in the formula (II), R is as defined in the formula (I)), (3) the epoxy resin according to the aforementioned item (1) wherein P is hydrogen atom and the plot of y vs. x is present within the area surrounded by the lines of 1) $y=70e^{-0.115x}$, 2) $y=1000e^{-0.115x}$, 3) $x=10$ and 4) $x=70$, (4) the epoxy resin according to the aforementioned item (1) or (3) wherein P is hydrogen atom and an epoxy resin component contained in a fraction which constitutes the top peak (the highest peak) obtained by GPC (gel permeation chromatography) is a 3 nucleus body or a body with more than 3 nuclei, (5) the epoxy resin according to any one of the aforementioned items (1), (3) and (4) wherein P is hydrogen atom and its melt viscosity is 0.1 to 400 poises, (6) the epoxy resin according to the aforementioned item (1) or (2) wherein P is methyl group and the concentration of hydrolyzable halogen is 600 ppm or less, (7) the epoxy resin according to the aforementioned items (1), (2) and (6) wherein P is methyl group and the plot of y vs. x is present within the area surrounded by the lines of 1) $y=500e^{-0.120x}$, 2) $y=5000e^{-0.120x}$, 3) $y=100$ and 4) $y=0.2$, (8) the epoxy resin according to any one of the aforementioned items (1), (2), (6) and (7) wherein P is methyl group, and the ratio of c/d is 2.0 or less, the c (% by weight) being the rate of an epoxy resin component contained in a fraction which constitutes the top peak (the highest peak) obtained by GPC to the total epoxy resin and the d (% by weight) being the rate of an epoxy resin component contained in a fraction which constitutes the second peak (the second highest peak) to the total epoxy resin, (9) an epoxy resin composition which comprises the epoxy resin of any one of the aforementioned items (1) to (8),

(10) the epoxy resin composition according to the aforementioned item (9) wherein it is prepared for use in semiconductor sealing, and

(11) a hardened product which is obtained by hardening the epoxy resin composition of the aforementioned item (9) or (10).

DETAILED DESCRIPTION OF THE INVENTION

In the epoxy resin described in the aforementioned item (1), the term "m nucleus bodies" (m is an integer) means a molecule of the epoxy resin represented by the formula (I) in which m in number of aromatic rings are contained in one molecule (the same shall apply hereinafter). In the following novolak type resin, the term "w nucleus bodies" (w is an integer) means a molecule of the novolak type resin in which w in number of aromatic rings are contained in one molecule (the same shall apply hereinafter).

Figure 1:
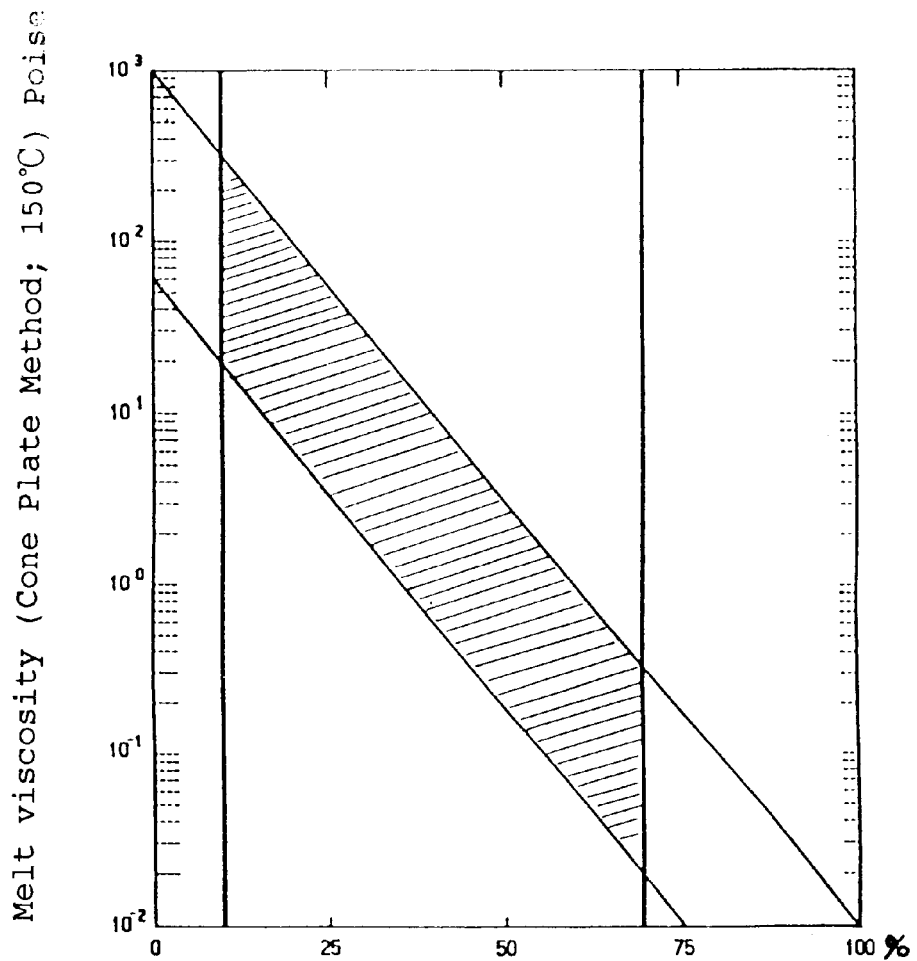
FIG. 1 is a graph showing a relationship between the melt viscosity of the epoxy resin of the present invention and the ratio of 3 to 6 nucleus bodies to the total epoxy resin (% by weight), when P in the formula (I) is hydrogen atom. The epoxy resin of the present invention is present within the range shown as a shaded portion in FIG. 1.

According to the epoxy resin of the present invention, when P in the aforementioned formula (I) is hydrogen atom, the plot of melt viscosity of the epoxy resin measured at 150° C. by a cone plate method (variable, y; unit, poise) vs. the % ratio of the total weight of 3 to 6 nucleus bodies in said epoxy resin (variable, x; unit, % by weight) is present within the area surrounded by the lines of 1) $y=60e^{0.115x}$, 2) $y=1000e^{-0.115x}$, 3) $x=10$ and 4) $x=70$ (see FIG. 1), preferably within the area surrounded by the lines of 1) $y=70e^{-0.115x}$, 2) $y=1000e^{-0.115x}$, 3) $x=10$ and 4) $x=70$, more preferably within the area surrounded by the lines of 1) $y=70e^{-0.115x}$, 2) $y=600e^{-0.115x}$, 3) $x=10$, 4) $x=70$, 5) $y=50$ and 6) $y=0.5$.

Figure 2:
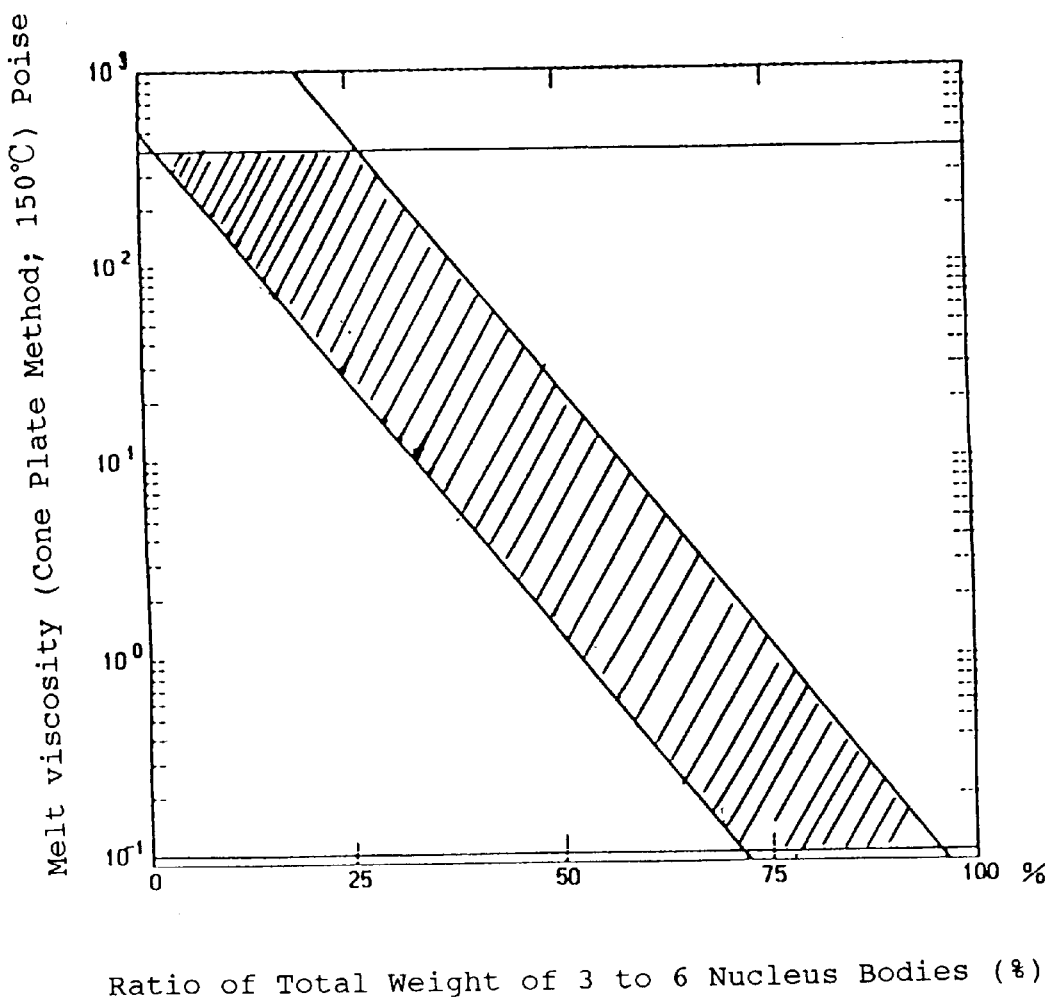
FIG. 2 is a graph showing a relationship between the melt viscosity of the epoxy resin of the present invention and the ratio of 3 to 6 nucleus bodies to the total epoxy resin (% by weight), when P in the formula (I) is methyl group. The epoxy resin of the present invention is present within the range shown as a shaded portion in FIG. 2.

Also, when P in the aforementioned formula (I) is methyl group, similar plot of y vs. x is present within the area surrounded by the lines of 1) $y=500e^{-0.120x}$, 2) $y=10000e^{-0.120x}$, 3) $y=400$ and 4) $y=0.1$ (see FIG. 2), preferably within the area surrounded by the lines of 1) $y=500e^{-0.120x}$, 2) $y=5000e^{-0.120x}$, 3) $y=100$ and 4) $y=0.2$, more preferably within the area surrounded by the lines of 1) $y=800e^{-0.120x}$, 2) $y=3000e^{-0.120x}$, 3) $y=0.5$ and 4) $y=50$.

The epoxy resin of the present invention can be obtained for example by allowing epihalohydrins to react with a phenol novolak resin or cresol novolak resin which is obtained by removing components other than 3 to 6 nucleus bodies, by means of a column treatment or heat distillation under high vacuum, from a novolak type resin prepared by condensation polymerization of phenol or cresol with formaldehyde using an acid catalyst.

The total content of 3 to 6 nucleus bodies in such a phenol novolak resin or cresol novolak resin is generally 30 to 90% by weight, preferably 35 to 85% by weight.

With regard to the cresol described above, o-cresol, m-cresol, p-cresol or a mixture thereof can be exemplified, but a cresol novolak resin obtained from o-cresol alone is desirable.

Illustrative examples of the epihalohydrins to be used in the epoxidation reaction include epichlorohydrin, β-methylepichlorohydrin, epibromohydrin, β-methylepibromohydrin, epiiodohydrin, β-ethylepichlorohydrin and the like, of which epichlorohydrin is desirable because it can be easily obtained industrially and is inexpensive. The epoxidation reaction may be carried out by a known method.

The epoxidation reaction is carried out for example at 20 to 120° C. for 0.5 to 10 hours by adding solid form of sodium hydroxide, potassium hydroxide or the like alkali metal hydroxide in one portion or gradually in small portions to a mixture consisting of the aforementioned novolak type resin and epihalohydrins. In this connection, the alkali metal hydroxide may be used as its aqueous solution, and, in that case, the reaction may be effected by a method in which said alkali metal hydroxide is continuously added while simultaneously distilling water and epihalohydrins continuously from the reaction mixture under a reduced pressure or ordinary pressure, and the distillate is partitioned to remove water and return the epihalohydrins continuously into the reaction mixture.

In the aforementioned method, epihalohydrins are used in an amount of generally from 0.5 to 20 moles, preferably from 0.7 to 10 moles, based on 1 equivalent of hydroxyl group of the novolak type resin. The alkali metal hydroxide is used in an amount of generally from 0.5 to 1.5 moles, preferably from 0.7 to 1.2 moles, based on 1 equivalent of hydroxyl group of the novolak type resin. In addition, an epoxy resin having low concentration of hydrolyzable halogen which will be defined later can be obtained by adding dimethyl sulfone, dimethyl sulfoxide, dimethylformamide, 1,3-dimethyl-2-imidazolidinone or the like aprotic polar solvent, and such a type of epoxy resin is suitable for use in the sealing of electronic materials. The aprotic polar solvent is used in an amount of generally from 5 to 200% by weight, preferably from 10 to 100% by weight, based on the weight of epihalohydrins. The addition of an alcohol such as methanol or ethanol, or a cyclic or chain ether such as 1,4-dioxane other than the aforementioned solvents renders possible smooth progress of the reaction and reduction of hydrolyzable halogen concentration which is still higher than the case of the use of aprotic polar solvents but lower than the case of no solvents. Toluene, xylene and the like solvents can also be used. The hydrolyzable halogen concentration can be measured for example by putting the epoxy resin into 1 N KOH/ethanol solution together with dioxane, heating the mixture under reflux for several tens of minutes and then titrating it with a silver nitrate solution.

Alternatively, the epoxy resin of the present invention can be obtained by a method in which a mixture consisting of a novolak type resin and an excess amount of epihalohydrins is subjected to 1 to 10 hours of reaction at 50 to 150° C. using tetramethylammonium chloride, tetramethylammonium bromide, trimethylbenzylammonium chloride or the like quaternary ammonium salt as a catalyst, and the thus obtained halohydrin ether of novolak type resin is mixed with solid form or aqueous solution of sodium hydroxide, potassium hydroxide or the like alkali metal hydroxide and subjected to 1 to 10 hours of reaction at 20 to 120° C. to effect cyclization of the halohydrin ether. In this case, the quaternary ammonium salt may be used in an amount of generally from 0.001 to 0.2 mole, preferably from 0.05 to 0.1 mole, based on 1 equivalent of hydroxyl group of the novolak type resin. The alkali metal hydroxide may be used in an amount of generally from 0.8 to 1.5 moles, preferably from 0.9 to 1.1 moles, based on 1 equivalent of hydroxyl group of the novolak type resin.

In general, an epoxy resin having low hydrolyzable halogen concentration can be obtained by heating the epoxidation reaction product under a reduced pressure after washing with water or without washing, thereby removing excess epihalohydrins and the solvents used in the reaction, dissolving the thus treated product in toluene, methyl isobutyl ketone, methyl ethyl ketone or the like solvent and then carrying out the reaction again by adding an aqueous solution of sodium hydroxide, potassium hydroxide or the like alkali metal hydroxide. In this case, the alkali metal hydroxide is used in an amount of generally from 0.01 to 0.2 mole, preferably from 0.05 to 0.1 mole, based on 1 equivalent of hydroxyl group of the novolak type resin. The reaction temperature is generally 50 to 120° C., and the reaction time is generally 0.5 to 2 hours. After completion of the reaction, by-produced salts are removed by filtration, washing with water or the like means and toluene, methyl isobutyl ketone, methyl ethyl ketone and the like solvents used are evaporated off, thereby obtaining the epoxy resin of the present invention having low hydrolyzable halogen concentration.

In the thus obtained epoxy resin of the present invention, when P in the formula (I) is hydrogen atom, an epoxy resin component contained in a fraction which constitutes the top peak (the highest peak, the same shall apply hereinafter) obtained by GPC (gel permeation chromatography, the same shall apply hereinafter) is preferably a 3 nucleus body or a body with more than 3 nuclei. Also, its melt viscosity measured at 150° C. by a cone plate method is preferably 0.1 to 400 poises.

In the epoxy resin of the present invention, when P in the formula (I) is methyl group, the resin represented by the formula (II) is desirable. In such a type of epoxy resin, the ratio between the rate of an epoxy resin component contained in a fraction which constitutes the top peak obtained by GPC to the total epoxy resin (c; % by weight) and the rate of an epoxy resin component contained in a fraction which constitutes the second peak (the second highest peak, the same shall apply hereinafter) to the total epoxy resin (d; % by weight), namely the ratio c/d, is preferably 2.0 or less, more preferably 1.8 or less.

Also, in the case of an epoxy resin in which P in the formula (I) is methyl group, its hydrolyzable halogen concentration is generally 600 ppm or less, preferably 450 ppm or less.

The following describes the epoxy resin composition of the present invention.

According to the epoxy resin composition of the present invention, the epoxy resin of the present invention may be used alone or together with other epoxy resins. When used together with the other epoxy resins, the epoxy resin of the present invention may occupy preferably 30% by weight or more, more preferably 40% by weight or more, of the total epoxy resins.

The other epoxy resins which can be used jointly with the epoxy resin of the present invention are not particularly limited, with the proviso that they are generally used epoxy resins, and their illustrative examples include polycondensation products of bisphenols or phenols (phenol, alkyl-substituted phenol, naphthol, alkyl-substituted naphthol, dihydroxybenzene, dihydroxynaphthalene and the like) with various aldehydes, polymers of phenols with various diene compounds, polycondensation products of phenols with an aromatic dimethylol, glycidyl ether epoxy resins obtained by glycidylation of biphenols or alcohols, alicyclic epoxy resins, glycidylamine epoxy resins, glycidyl ester epoxy resins and the like. These epoxy resins may be used alone or as a mixture of two or more.

In a preferred mode, the epoxy resin composition of the present invention contains a hardening agent. As the hardening agent, an amine compound, an acid anhydride compound, an amide compound, a phenolic compound or the like can be used. Illustrative examples of the hardening agent to be used include diaminodiphenylmethane, diethylenetriamine, triethylenetetramine, diaminodiphenyl sulfone, isophoronediamine, dicyandiamide, a polyamide resin synthesized from linolenic acid dimer and ethylenediamine, phthalic anhydride, trimellitic anhydride, pyromellitic anhydride, maleic anhydride, tetrahydrophthalic anhydride, methyltetrahydrophthalic anhydride, methylnadic anhydride (General Name: Methyl endo methylene tetrahydrophthalic anhydride), hexahydrophthalic anhydride, methylhexahydrophthalic anhydride, polycondensation products of bisphenols or phenols (phenol,, alkyl-substituted phenol,, naphthol, alkyl-substituted naphthol, dihydroxybenzene, dihydroxynaphthalene and the like) with various aldehydes, polycondensation products of phenols with various diene compounds, polycondensation products of phenols with an aromatic dimethylol, biphenols and modified products thereof, imidazole, $BF_3$-amine complex, guanidine derivatives and the like. The hardening agent may be used in an amount of preferably from 0.5 to 1.5 equivalents, more preferably from 0.6 to 1.2 equivalents, based on 1 equivalent of epoxy group of the epoxy resin. When the amount is smaller than 0.5 equivalent or larger than 1.5 equivalents based on 1 equivalent of epoxy group, hardening becomes incomplete so that proper properties of hardening products may not be obtained in both cases.

When the aforementioned hardening agent is used, a hardening accelerator can be jointly used with no problems. Illustrative examples of the hardening accelerator to be used include 2-methylimidazole, 2-ethylimidazole, 2-ethyl-4-methylimidazole and the like imidazoles, 2-(dimethylaminomethyl)phenol, 1,8-diaza-bicyclo(5,4,0) undecene-7 and the like tertiary amines, triphenylphosphine and the like phosphines and tin octylate and the like metal compounds. The hardening accelerator may be used as occasion demands in an amount of from 0.01 to 15 parts by weight per 100 parts by weight of the epoxy resin.

In addition, the epoxy resin composition of the present invention may further contain silica, alumina, talc and the like fillers and a silane coupling agent, a release agent, a pigment and the like various blending agents as occasion demands.

The epoxy resin composition of the present invention can be obtained by uniformly mixing predetermined amounts of the aforementioned respective components and is desirably used as a semiconductor sealing material. The epoxy resin composition of the present invention can be made easily into a hardened product by a generally known method. For example, the hardened product of the present invention can be obtained by a method in which the epoxy resin of the present invention and a hardening agent, as well as a hardening accelerator, a filler and a blending agent as occasion demands, are mixed thoroughly until they become a uniform mixture if necessary using an extruder, a kneader, a roller or the like means, thereby obtaining the epoxy resin composition of the present invention, and the epoxy resin composition is then molded by melt casting, transfer molding, injection molding, compression molding or the like means, and if necessary heating it at 80 to 200° C.

Alternatively, the hardened product of the present invention can be obtained by dissolving the epoxy resin composition of the present invention in toluene, xylene, acetone, methyl ethyl ketone, methyl isobutyl ketone or the like solvent, impregnating glass fiber, carbon fiber, polyester fiber, polyamide fiber, alumina fiber, paper or the like base material with the thus prepared solution, drying the resulting material with heat and then subjecting the thus obtained pre-preg to hot press molding.

In that case, the solvent is used in such an amount that it occupies generally 10 to 70% by weight, preferably 15 to 65% by weight, of the total weight of the epoxy resin composition of the present invention and the solvent.

EXAMPLES

The present invention is described more illustratively with reference to the following examples. In this connection, the present invention is not restricted by these examples. In the examples, the ratio of the total weight of 3 to 6 nucleus bodies in the epoxy resin (x; % by weight), the ratio between the rate of an epoxy resin component contained in a fraction which constitutes the top peak obtained by GPC measurement to the total epoxy resin (c; % by weight) and the rate of an epoxy resin component contained in a fraction which constitutes the second peak to the total epoxy resin (d; % by weight), epoxy equivalent weight, ICI viscosity (y), softening point and hydrolyzable chlorine concentration were measured under the following conditions.
(1) Ratio of 3 to 6 nucleus bodies; aforementioned x, and
(2) (weight % of top peak; c)/( weight % of second peak; d):

Each sample was analyzed by a GPC analyzer, and each ratio was calculated from the area percentage of the peak of respective component.

GPC analysis conditions
  Column: Shodex KF-803 (2 columns)+KF-802.5 (2 columns)
  Column temperature: 40° C.
  Solvent: tetrahydrofuran
  Detection: UV (254 nm)
  Flow rate: 1 ml/min.
(3) Epoxy equivalent weight
  Measured in accordance with the procedure of JIS K-7236.
(4) ICI viscosity; aforementioned y
  Melt viscosity at 150° C. by a cone plate method
  Measuring apparatus: cone plate (ICI) high temperature viscometer (manufactured by RESEARCH EQUIPMENT (LONDON) LTD.)
  Cone No.: 3 (measuring range, 0 to 20 poises)
  Amount of sample: 0.15±0.01 (g)
(5) Softening point
  Measured in accordance with the procedure of JIS K-7234
(6) Hydrolyzable chlorine concentration
  A value obtained by adding 1 N KOH ethanol solution to dioxane solution of each sample, heating the mixture under reflux for 30 minutes, measuring amount of the thus released chlorine by silver nitrate titration and then dividing the measured value by the weight of sample.

Example 1

A reaction vessel was charged with 105 parts by weight of a phenol novolak resin in which the total weight ratio of 3 to 6 nucleus bodies had been adjusted to 59% by weight by a column treatment, 400 parts by weight of epichlorohydrin (ECH, the same shall apply hereinafter) and 40 parts by weight of methanol, the materials were heated, stirred, dissolved and kept at 75° C., and then 41 parts by weight of flaky sodium hydroxide was added to the solution in small portions over 2 hours. After completion of the addition of sodium hydroxide, the reaction was continued for additional 2 hours at 75° C. Next, washing with water was repeated to remove formed salts and methanol, excess ECH was evaporated of from the oil layer by heating it under a reduced pressure and then the resulting residue was dissolved in 300 parts by weight of methyl isobutyl ketone.

The methyl isobutyl ketone solution was heated at 70° C. and mixed with 10 parts by weight of 30% by weight sodium hydroxide aqueous solution, and the mixture was subjected to 1 hour of reaction and then repeatedly washed with water until the washing solution became neutral. Thereafter, methyl isobutyl ketone was evaporated from the oil layer by heating it under a reduced pressure to obtain 145 parts by weight of the epoxy resin (E1) of the present invention. The thus obtained epoxy resin (E1) showed an epoxy equivalent weight of 193 g/eq, a softening point of 49° C. and an ICI viscosity (y) of 0.8 poise at 150° C., and the total weight % of 3 to 6 nucleus bodies (x) was 43% by weight and the epoxy resin component in the top peak by GPC measurement (to be referred simply to as top peak hereinafter) was a 4 nucleus body.

Example 2

The procedure of Example 1 was repeated except that the total weight ratio of 3 to 6 nucleus bodies of the phenol novolak resin of Example 1 was changed to 51% by weight, thereby obtaining 141 parts by weight of the epoxy resin (E2) of the present invention. The thus obtained epoxy resin (E2) showed an epoxy equivalent weight of 197 g/eq, a softening point of 60° C. and an ICI viscosity (y) of 1.9 poises at 150° C., and the total weight % of 3 to 6 nucleus bodies (x) was 36% by weight and the epoxy resin component in the top peak was a 4 nucleus body.

Example 3

The procedure of Example 1 was repeated except that the total weight ratio of 3 to 6 nucleus bodies of the phenol novolak resin of Example 1 was changed to 47% by weight, thereby obtaining 152 parts by weight of the epoxy resin (E3) of the present invention. The thus obtained epoxy resin (E3) showed an epoxy equivalent weight of 200 g/eq, a softening point of 69° C. and an ICI viscosity (y) of 4.2 poises at 150° C., and the total weight % of 3 to 6 nucleus bodies (x) was 31% by weight and the epoxy resin component in the top peak was a 5 nucleus body.

Example 4

A reaction vessel was charged with 120 parts by weight of an o-cresol novolak resin in which the total weight ratio of 3 to 6 nucleus bodies had been adjusted to 76% by weight by a column treatment, 555 parts by weight of ECH and 52 parts by weight of dimethyl sulfoxide, the materials were heated, stirred, dissolved and kept at 45° C. while keeping the reaction system at 45 Torr, and then 35 parts by weight of 40% by weight sodium hydroxide aqueous solution was continuously added dropwise to the solution over 4 hours. In this case, the reaction was carried out by cooling and partitioning ECH and water evaporated by azeotropic distillation and returning only ECH as the organic layer into the reaction system. After completion of the dropwise addition of sodium hydroxide aqueous solution, the reaction was continued for 2 hours at 45° C. and then for 30minutes at 70°

C. Next, washing with water was repeated to remove by-produced salts and dimethyl sulfoxide, excess ECH was evaporated from the oil layer by heating it under a reduced pressure and then the resulting residue was dissolved in 400 parts by weight of methyl isobutyl ketone.

The methyl isobutyl ketone solution was heated at 70° C. and mixed with 7 parts by weight of 30% by weight sodium hydroxide aqueous solution, and the mixture was subjected to 1 hour of reaction and then repeatedly washed with water until the washing solution became neutral. Thereafter, methyl isobutyl ketone was evaporated from the oil layer by heating it under a reduced pressure to obtain 160 parts by weight of the epoxy resin (E4) of the present invention. The thus obtained epoxy resin (E4) showed an epoxy equivalent weight of 195 g/eq, a softening point of 58° C., an ICI viscosity (y) of 1.2 poises at 150° C. and a hydrolyzable chlorine concentration of 350 ppm, and the total weight % of 3 to 6 nucleus bodies (x) was 61% by weight and its c/d ratio was 1.2.

Example 5

The procedure of Example 1 was repeated except that an o-cresol novolak resin having 67% by weight of total of 3 to 6 nucleus bodies was used, thereby obtaining 156 parts by weight of the epoxy resin (E5) of the present invention. The thus obtained epoxy resin (E5) showed an epoxy equivalent weight of 200 g/eq, a softening point of 68° C., an ICI viscosity (y) of 2.8 poises at 150° C. and a hydrolyzable chlorine concentration of 370 ppm, and the total weight % of 3 to 6 nucleus bodies (x) was 54% by weight and its c/d ratio was 1.2.

Example 6

The procedure of Example 1 was repeated except that an o-cresol novolak resin having 58% by weight of total of 3 to 6 nucleus bodies was used, thereby obtaining 152 parts by weight of the epoxy resin (E6) of the present invention. The thus obtained epoxy resin (E6) showed an epoxy equivalent weight of 204 g/eq, a softening point of 83° C., an ICI viscosity (y) of 8.8 poises at 150° C. and a hydrolyzable chlorine concentration of 400 ppm, and the total weight % of 3 to 6 nucleus bodies (x) was 41% by weight and its c/d ratio was 1.3.

Comparative Example 1

The procedure of Example 1 was repeated except that the phenol novolak resin of Example 1 was changed to a phenol novolak resin which was not subjected to the column treatment and had a softening point of 79° C., thereby obtaining an epoxy resin (R1). The thus obtained epoxy resin (R1) showed an epoxy equivalent weight of 191 g/eq, a softening point of 48° C. and an ICI viscosity (y) of 0.8 poise at 150° C., and the total weight % of 3 to 6 nucleus bodies (x) was 35% by weight and the epoxy resin component in the top peak was a 2 nucleus body.

Comparative Example 2

The procedure of Example 1 was repeated except that the phenol novolak resin of Example 1 was changed to a phenol novolak resin which was not subjected to the column treatment and had a softening point of 110° C., thereby obtaining an epoxy resin (R2). The thus obtained epoxy resin (R2) showed an epoxy equivalent weight of 195 g/eq, a softening point of 65° C. and an ICI viscosity (y) of 4.9 poises at 150° C., and the total weight % of 3 to 6 nucleus bodies (x) was 25% by weight and the epoxy resin component in the top peak was a 2 nucleus body.

Examples 7 to 9 and Comparative Examples 3 and 4

Each of the epoxy resins (E1) to (E3) obtained in Examples 1 to 3 and epoxy resins (R1) and (R2) obtained in Comparative Examples 1 and 2 was blended with a hardening agent (phenol novolak resin (manufactured by Nippon Kayaku Co., PN-80, 1.5 poises in ICI viscosity at 150° C., 86° C. in softening point and 106 g/eq in hydroxyl group equivalent weight) in an amount of 1 hydroxyl group equivalent per 1 epoxy group equivalent of the epoxy resin and further blended with a hardening accelerator (triphenylphosphine) in an amount of 1 part by weight per 100 parts by weight of the epoxy resin, and the thus prepared mixture was made into a molded resin article by transfer molding and then hardened at 160° C. for 2 hours and then at 180° C. for 8 hours.

Results of physical property measurement of each of the thus obtained hardened products are shown in Table 1.

In this case, the physical properties were measured by the following methods.

Glass transition temperature (TMA): TM-7000 mfd by Sinku Riko Co. Programming rate 2° C./min Water absorption: Weight increasing ratio (%) of a disc-like test piece of 5 cm in diameter and 4 mm in thickness after its boiling in water of 100° C. for 24 hours.

TABLE 1

|  | Ex. | | | Comparative Ex. | |
| --- | --- | --- | --- | --- | --- |
|  | 7 | 8 | 9 | 3 | 4 |
| Epoxy resin | E1 | E2 | E3 | R1 | R2 |
| Glass transition temp. (° C.) | 150 | 162 | 181 | 139 | 173 |
| Water absorption (%) | 0.99 | 1.17 | 1.38 | 0.97 | 1.54 |

Examples 10 and 11 and Comparative Examples 5 and 6

Each of the epoxy resins (E1) and (E3) obtained in Examples 1 and 3 and epoxy resins (R1) and (R2) obtained in Comparative Examples 1 and 2 was blended with a hardening agent (PN-80) in an amount of 1 hydroxyl group equivalent per 1 epoxy group equivalent of the epoxy resin, 0.2 part by weight of a hardening accelerator (triphenylphosphine), 0.8 part by weight of a silane coupling agent (KBM 403, manufactured by Shin-Etsu Chemical Co.), 0.5 part by weight of a releasing agent (Fine Carnauba Powder, manufactured by Toa Kasei Co.), 2.0 parts by weight of antimony trioxide and 6.0 parts by weight of a brominated epoxy resin (BREN-S, manufactured by Nippon Kayaku Co.), and a filler (FB-48, manufactured by Denki Kagaku Kogyo Co.) was blended with 20 parts by weight of the thus prepared mixture at the ratio (part by weight) shown in the column, Composition of Blends, of Table 2. The resulting mixture was kneaded using a biaxial roller, pulverized and then made into tablets to measure fluidity (spiral flow value) of the thus obtained samples under the following conditions. The results are shown in Table 2.

Fluidity measuring conditions
  Mold: based on EMMI-1-66
  Mold temperature: 170° C.
  Transfer pressure: 70 kg/cm$^2$ Also, hardened products were obtained from the aforementioned tablets in the same manner as described in Examples 7 to 9, and their characteristics were measured under the following conditions. The results are shown in Table 2.

Glass transition temperature: The same as in Examples 7 to 9.

Water absorption: The same as in Examples 7 to 9.

Bending strength: Measured at 300° C. in accordance with the procedure of JIS-6481 (bending strength).

Coefficient of thermal expansion: Measured by TMA within a range of 40 to 110° C.

TABLE 2

|  | Ex. | | Comparative Ex. | |
| --- | --- | --- | --- | --- |
|  | 10 | 11 | 5 | 6 |
| Composition of blends | | | | |
| Epoxy resin | E1 | E3 | R1 | R2 |
| Filler (parts by weight) | 80 | 60 | 80 | 60 |
| Spiral flow value (cm) | 55 | 60 | 56 | 58 |
| Physical properties of hardened products | | | | |
| Glass transition temp. (° C.) | 152 | 183 | 140 | 173 |
| Water absorption (%) | 0.16 | 0.31 | 0.17 | 0.39 |
| Bending strength (kgf/mm$^2$) | 18 | 17 | 17 | 15 |
| Coefficient of thermal expansion (x $10^{-5}$/° C.) | 1.3 | 1.6 | 1.4 | 1.7 |

Examples 12 to 14 and Comparative Examples 7 to 9

Each of the epoxy resins (E4) to (E6) obtained in Examples 4 to 6 and a cresol novolak resin (EOCN-1020 manufactured by Nippon Kayaku Co.) used in Comparative Examples was blended with a hardening agent (PN-80) in an amount of 1 hydroxyl group equivalent per 1 epoxy group equivalent of the epoxy resin and further blended with a hardening accelerator (triphenylphosphine) in an amount of 1 part by weight per 100 parts by weight of the epoxy resin, and hardened products were obtained in the same manner as described in Examples 7 to 9.

Results of physical property measurement of each of the thus obtained hardened products are shown in Table 3. In this case, the physical properties were measured in the same manner as described in Examples 7 to 9.

TABLE 3

|  | Ex. | | | Comparative Ex. | | |
| --- | --- | --- | --- | --- | --- | --- |
|  | 12 | 13 | 14 | 7 | 8 | 9 |
| Epoxy resin | E4 | E5 | E6 | R3 | R4 | R5 |
| Glass transition temp. (° C.) | 167 | 174 | 180 | 159 | 168 | 177 |
| Water absorption (%) | 1.01 | 1.13 | 1.21 | 1.12 | 1.26 | 1.35 |

The epoxy resins for comparison use (R3) to (R5) shown in Table 3 are as follows (the same resins are used in Table 5).

R3: EOCN-1020 ICI viscosity (150° C.), 1.2 poises 3 to 6 nucleus body content, 43% by weight R4: EOCN-1020 ICI viscosity (150° C.), 2.8 poises 3 to 6 nucleus body content, 36% by weight R5: EOCN-1020 ICI viscosity (150° C.), 8.8 poises 3 to 6 nucleus body content, 28% by weight

Examples 15 to 19 and Comparative Examples 10 to 14

Each of the epoxy resins (E4) to (E6) obtained in Examples 4 to 6 and EOCN-1020 in Comparative Examples was blended with a hardening agent (PN-1) in an amount of 1 hydroxyl group equivalent per 1 epoxy group equivalent of the epoxy resin, 0.2 part by weight of a hardening accelerator (triphenylphosphine), 0.8 part by weight of a silane coupling agent (KBM 403, manufactured by Shin-Etsu Chemical Co.), 0.5 part by weight of a releasing agent (Fine Carnauba Powder, manufactured by Toa Kasei Co.), 2.0 parts by weight of antimony trioxide and 6.0 parts by weight of a brominated epoxy resin (BREN-S, manufactured by Nippon Kayaku Co.), and a filler (FB-48, manufactured by Denki Kagaku Kogyo Co.) was blended with 20 parts by weight of the thus prepared mixture at the ratio (part by weight) shown in the column, Composition of Blends, of Tables 4 and 5. The resulting mixture was kneaded using a biaxial roller, pulverized and then made into tablets to measure fluidity (spiral flow value) of the thus obtained samples in the same manner as described in Examples 10 and 11. The results are shown in Tables 4 and 5. Also, hardened products were obtained from the aforementioned tablets in the same manner as described in Examples 7 to 9, and their characteristics were measured in the same manner as described in Examples 10 and 11.

TABLE 4

|  | Example No. | | | | |
| --- | --- | --- | --- | --- | --- |
|  | 15 | 16 | 17 | 18 | 19 |
| Composition of blends | | | | | |
| Epoxy resin | E4 | E5 | E6 | E4 | E5 |
| Filler (parts by weight) | 51 | 51 | 51 | 105 | 80 |
| Spiral flow value (cm) | 145 | 115 | 60 | 59 | 62 |
| Physical properties of hardened products | | | | | |
| Glass transition temp. (° C.) | 168 | 174 | 181 | 169 | 175 |
| Water absorption (%) | 0.26 | 0.28 | 0.31 | 0.16 | 0.22 |
| Bending strength (kgf/mm$^2$) | | | | | |
| 30° C. | 16 | 17 | 17 | 21 | 19 |
| 240° C. | 2.2 | 2.4 | 2.5 | 2.9 | 2.7 |
| Coefficient of thermal expansion (x $10^{-5}$/° C.) | 1.8 | 1.8 | 1.8 | 1.0 | 1.3 |

TABLE 5

|  | Comparative Example No. | | | | |
| --- | --- | --- | --- | --- | --- |
|  | 10 | 11 | 12 | 13 | 14 |
| Composition of blends | | | | | |
| Epoxy resin | R3 | R4 | R5 | R4 | R6 |
| Filler (parts by weight) | 51 | 51 | 51 | 80 | 63 |
| Spiral flow value (cm) | 147 | 114 | 55 | 65 | 60 |
| Physical properties of hardened products | | | | | |
| Glass transition temp. (° C.) | 159 | 167 | 178 | 167 | 176 |
| Water absorption (%) | 0.27 | 0.31 | 0.34 | 0.25 | 0.32 |
| Bending strength (kgf/mm$^2$) | | | | | |
| 30° C. | 15 | 16 | 17 | 18 | 16 |
| 240° C. | 2.1 | 2.3 | 2.5 | 2.6 | 2.5 |

TABLE 5-continued

| | Comparative Example No. | | | | |
|---|---|---|---|---|---|
| | 10 | 11 | 12 | 13 | 14 |
| Coefficient of thermal expansion (x $10^{-5}/°$ C.) | 1.8 | 1.8 | 1.8 | 1.3 | 1.6 |

The epoxy resin for comparison use (R6) shown in Table 5 is as follows.

R6: EOCN-1020 ICI viscosity (150° C.), 4.4 poises

Figure 3:
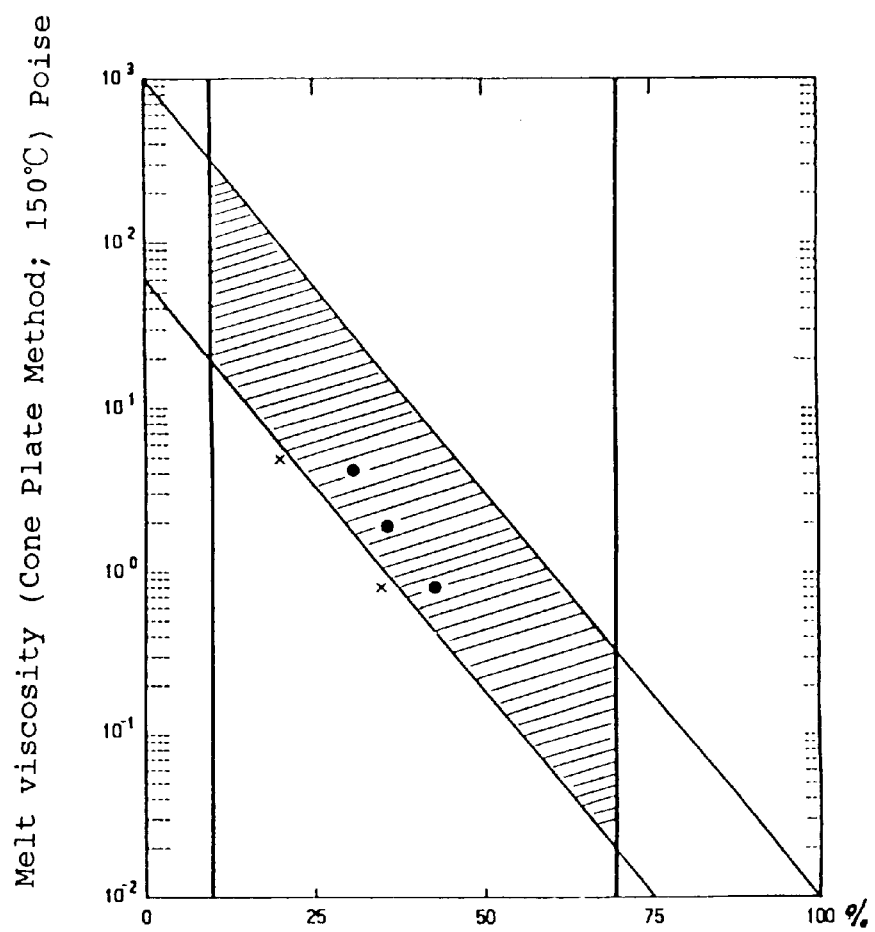
FIG. 3 is a graph showing a relationship between the melt viscosity and the ratio of 3 to 6 nucleus bodies to the total epoxy resin (% by weight) in each of the inventive and comparative epoxy resins. The symbol ● represents epoxy resins (E1) to (E3) of the present invention, and X represents comparative epoxy resins (R1) and (R2). The shaded portion in the drawing has the same meaning as in FIG. 1.
Figure 4:
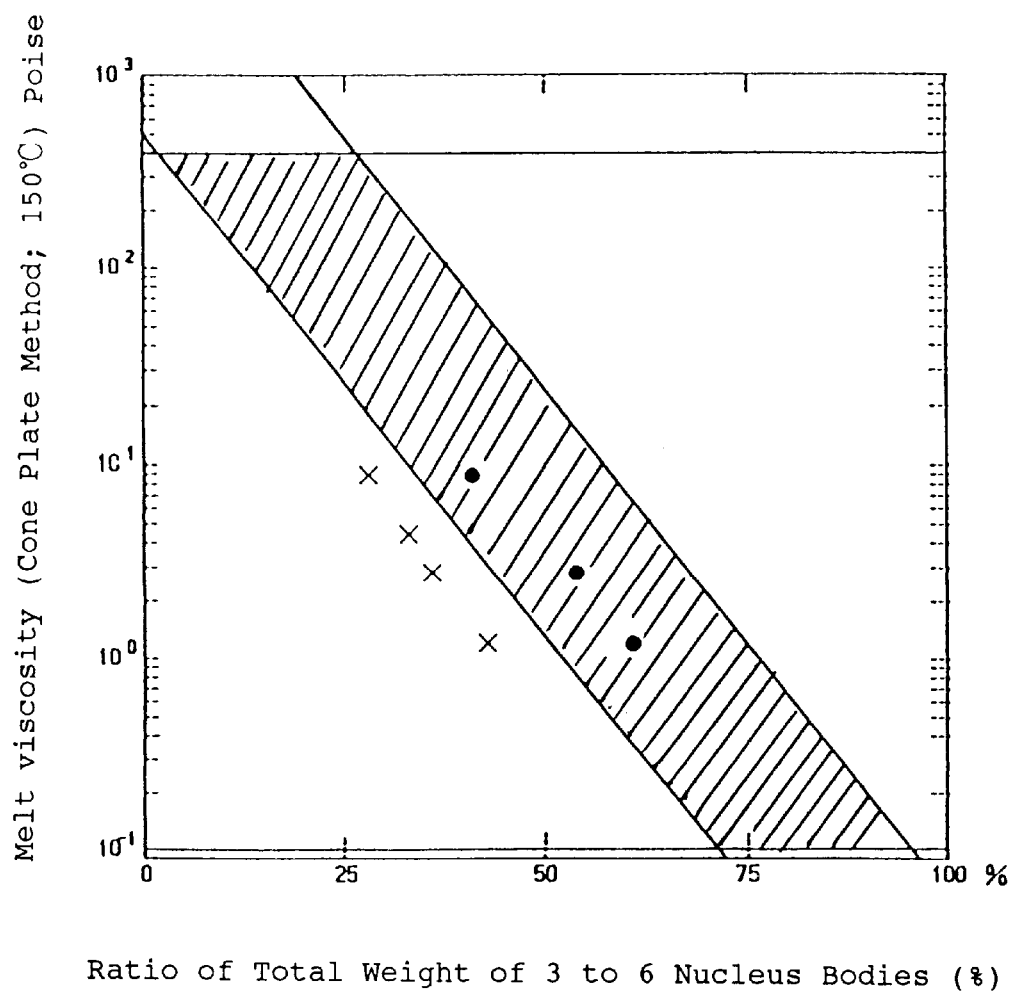
FIG. 4 is a graph showing a relationship between the melt viscosity and the ratio of 3 to 6 nucleus bodies to the total epoxy resin (% by weight) in each of the inventive and comparative epoxy resins. The symbol ● represents epoxy resins (E4) to (E6) of the present invention, and X represents comparative epoxy resins (R3) to (R6). The shaded portion in the drawing has the same meaning as in FIG. 2.

The aforementioned plot of y vs. x with regard to the epoxy resins (E1) to (E3) obtained in Examples 1 to 3 and the epoxy resins (R1) and (R2) of Comparative Examples is shown in FIG. 3, and the aforementioned plot of y vs. x with regard to the epoxy resins (E4) to (E6) obtained in Examples 4 to 6 and the epoxy resins (R3) to (R6) of Comparative Examples is shown in FIG. 4. The epoxy resin of the present invention wherein melt viscosity and the total ratio of 3 to 6 nucleus bodies are within the specified ranges can have more higher heat resistance than that of the known epoxy resin whose properties are outside the above ranges when they have similar level of fluidity, and renders possible increment of fillers in the composition because of the low viscosity when similar level of heat resistance is required and, as is evident from Tables 1 to 5, its hardened products have high heat resistance.

EFFECT OF THE INVENTION

In comparison with the case of the use of the conventional novolak type epoxy resin, the epoxy resin composition which contains the epoxy resin of the present invention can have more higher heat resistance when they have similar level of fluidity and renders possible increment of fillers in the composition because of the low viscosity when similar level of heat resistance is required, and, as the results, low expansion, low moisture absorption, high strength and the like properties can be obtained. Also, when the epoxy resin is dissolved in a solvent, its viscosity similar to that of known phenol novolak epoxy resin can be obtained with more smaller amounts of the solvent, which is profitable from the viewpoint of working environment. In consequence, the epoxy resin of the present invention is markedly valuable when used in electric and electronic parts insulating materials (such as high reliability semiconductor sealing materials and the like) and various composite materials including laminated sheets (printed circuit boards and the like) and CFRP, as well as adhesives, paints and the like.

We claim:

1. An epoxy resin obtained by using a cresol novolak resin of which the total content of 3 to 6 nucleus bodies is 67 to 90% by weight, said epoxy resin being represented by the following formula (I):

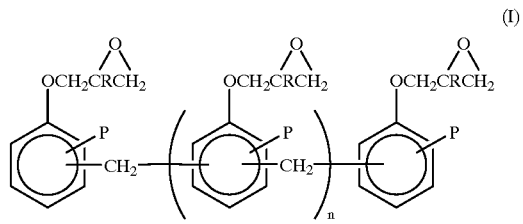

(in the formula (I), each P represents a methyl group, R represents a hydrogen atom or an alkyl group having 1 to 5 carbon atoms, and n is a positive number of 0.1 to 20 on average), wherein the plot of melt viscosity of said epoxy resin measured at 150° C. by a cone plate method (variable, y: unit, poise) vs. the ratio of the total weight of 3 to 6 nucleus bodies in said epoxy resin (variable, x: unit, % by weight) satisfies the following conditions:

said plot is present within the area surrounded by the lines of:
1) $y=500e^{-0.120x}$, 2) $y=1000e^{-0.120x}$, 3) $y=400$ and 4) $y=0.1$, and the ratio of c/d is 1.8 or less, c (% by weight) being the amount of an epoxy resin component contained in a fraction which constitutes the highest peak obtained by gel permeation chromatography (GPC) to the total epoxy resin and d being the amount of an epoxy resin component contained in a fraction which constitutes the second highest peak to the total epoxy resin.

2. The epoxy resin according to claim 1 wherein the epoxy resin is an epoxy resin represented by the following formula (II):

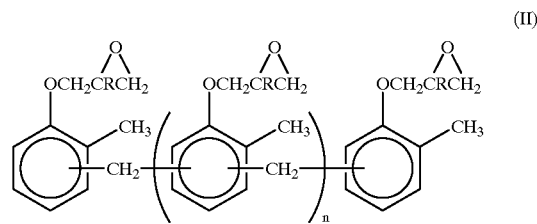

(in the formula (II), R and n are as defined in the formula (I)).

3. The epoxy resin according to claim 1 or 2 wherein the plot of y vs. x is present within the area surrounded by the lines 1) $y=500e^{-0.120x}$, 2) $y=5000e^{-0.120x}$, 3) $y=100$ and 4) $y=0.2$.

4. The epoxy resin according to any one of claims 1 or 2, wherein the concentration of hydrolyzable halogen is 600 ppm or less.

5. An epoxy resin composition which comprises the epoxy resin of any one of claims 1 or 2.

6. The epoxy resin composition according to claim 5 wherein it is prepared for use in semiconductor sealing.

7. A hardened product which is obtained by hardening the epoxy resin composition of claim 5.

8. An epoxy resin composition which comprises the epoxy resin of claim 3.

9. An epoxy resin composition which comprises the epoxy resin of claim 4.

10. The epoxy resin composition according to claim 8 wherein it is prepared for use in semiconductor sealing.

11. The epoxy resin composition according to claim 9 wherein it is prepared for use in semiconductor sealing.

12. A hardened product which is obtained by hardening the epoxy resin composition of claim 6.

13. A hardened product which is obtained by hardening the epoxy resin composition of claim 8.

14. A hardened product which is obtained by hardening the epoxy resin composition of claim 9.

15. A hardened product which is obtained by hardening the epoxy resin composition of claim 10.

16. A hardened product which is obtained by hardening the epoxy resin composition of claim 11.

17. The epoxy resin according to claim 3 wherein the concentration of hydrolyzable halogen is 600 ppm or less.

* * * * *

UNITED STATES PATENT AND TRADEMARK OFFICE
CERTIFICATE OF CORRECTION

PATENT NO.    : 6,124,420
DATED         : September 26, 2000
INVENTOR(S)   : Kenichi Kuboki et al.

It is certified that error appears in the above-identified patent and that said Letters Patent is hereby corrected as shown below:

Column 14,
Line 9, "y=1000e$^{-0.120x}$," should read -- y=10000e$^{-0.120x}$, --

Signed and Sealed this

Seventh Day of October, 2003

JAMES E. ROGAN
*Director of the United States Patent and Trademark Office*